(12) United States Patent
Hammacher et al.

(10) Patent No.: US 9,840,345 B2
(45) Date of Patent: Dec. 12, 2017

(54) METHOD AND DEVICE FOR PACKING STRIP-TYPE OBJECTS, ESPECIALLY STRIPS OF CHEWING GUM

(75) Inventors: Heinz-Peter Hammacher, Bamberg (DE); Bernhard Dressler, Forchheim (DE)

(73) Assignee: LOESCH VERPACKUNGSTECHNIK GMBH, Altendorf (DE)

( * ) Notice: Subject to any disclaimer, the term of this patent is extended or adjusted under 35 U.S.C. 154(b) by 997 days.

(21) Appl. No.: 14/115,765

(22) PCT Filed: Apr. 19, 2012

(86) PCT No.: PCT/EP2012/057145
§ 371 (c)(1),
(2), (4) Date: Nov. 5, 2013

(87) PCT Pub. No.: WO2012/152557
PCT Pub. Date: Nov. 15, 2012

(65) Prior Publication Data
US 2014/0137517 A1 May 22, 2014

(30) Foreign Application Priority Data
May 6, 2011 (DE) .......... 10 2011 075 439

(51) Int. Cl.
*B65B 5/06* (2006.01)
*B65B 11/42* (2006.01)
(Continued)

(52) U.S. Cl.
CPC .......... *B65B 5/06* (2013.01); *B65B 11/42* (2013.01); *B65B 11/46* (2013.01); *B65B 25/005* (2013.01);
(Continued)

(58) Field of Classification Search
CPC ...... B65B 25/005; B65B 11/46; A23G 7/0025
See application file for complete search history.

(56) References Cited

U.S. PATENT DOCUMENTS 2,807,390 A   9/1957  Bonebrake
3,099,375 A * 7/1963  Schoppee ............ A23G 4/04
                                                   225/104
(Continued)

FOREIGN PATENT DOCUMENTS

CN   2714425 Y    8/2005
CN   1968857 A   11/2005
(Continued)

*Primary Examiner* — Andrew M Tecco
*Assistant Examiner* — Praachi M Pathak
(74) *Attorney, Agent, or Firm* — Cislo & Thomas, LLP

(57) ABSTRACT

The invention relates to a method and a device for producing and packing individual strip-type objects, especially strips of chewing gum, comprising the following method steps and features: provision of rectangular sheets from which the strips are to be formed, the length of the shorter sides of the sheets corresponding to the length of a strip to be formed; formation of individual strips from the sheets provided; packing of the formed individual strips using a first packaging material; formation of a group of the individual packed strips; and packing of the formed group of strips using a second packaging material. The step of providing the sheets comprises the following additional method steps and features: creation of grooves in the sheets, said grooves extending parallel to the shorter sides of the sheets; and controlled supply of the individual sheets successively in the longitudinal direction thereof to the following step of forming the individual strips, in such a way that each sheet adjoins the respective previous sheet in a precise position, without gaps and without back pressure. The step of forming the individual strips comprises the following additional method steps and features: respective separation of an (Continued)

individual strip from the sheet on the front end thereof in the direction of transport by tearing along the respectively frontmost produced groove such that the supplied sheet and the separated strip are in the same plane; and acceleration of the separated strip in the direction of transport in order to create a gap between the individual successive strips.

20 Claims, 9 Drawing Sheets

(51) Int. Cl.
*B65B 11/46* (2006.01)
*B65B 35/44* (2006.01)
*B65B 35/46* (2006.01)
*B65B 35/50* (2006.01)
*B65B 25/00* (2006.01)
*B65G 47/84* (2006.01)

(52) U.S. Cl.
CPC .............. *B65B 35/44* (2013.01); *B65B 35/46* (2013.01); *B65B 35/50* (2013.01); *B65B 2220/16* (2013.01); *B65G 47/846* (2013.01)

(56) References Cited

U.S. PATENT DOCUMENTS

| | | | | |
|---|---|---|---|---|
| 3,933,064 | A * | 1/1976 | Schoppee | B65B 35/40 83/112 |
| 4,070,851 | A * | 1/1978 | Schoppee | B65B 11/46 225/104 |
| 4,875,326 | A * | 10/1989 | Piano | B65B 35/26 53/435 |
| 5,309,697 | A | 5/1994 | Hammacher et al. | |
| 5,632,378 | A | 5/1997 | Provost | |
| 7,032,754 | B2 | 4/2006 | Kopecky | |
| 2,652,788 | A1 | 7/2013 | Shaw et al. | |
| 2003/0208988 | A1* | 11/2003 | Buckley | B65B 61/02 53/411 |
| 2010/0307106 | A1 | 12/2010 | Carrara et al. | |
| 2015/0245633 | A1* | 9/2015 | Backes | A23G 4/02 426/5 |

FOREIGN PATENT DOCUMENTS

| | | |
|---|---|---|
| DE | 02038866 | 2/1972 |
| DE | 02038866 A1 | 2/1972 |
| DE | 03043991 | 6/1982 |
| DE | 03043991 A1 | 6/1982 |
| JP | 58-157626 A | 9/1983 |

* cited by examiner

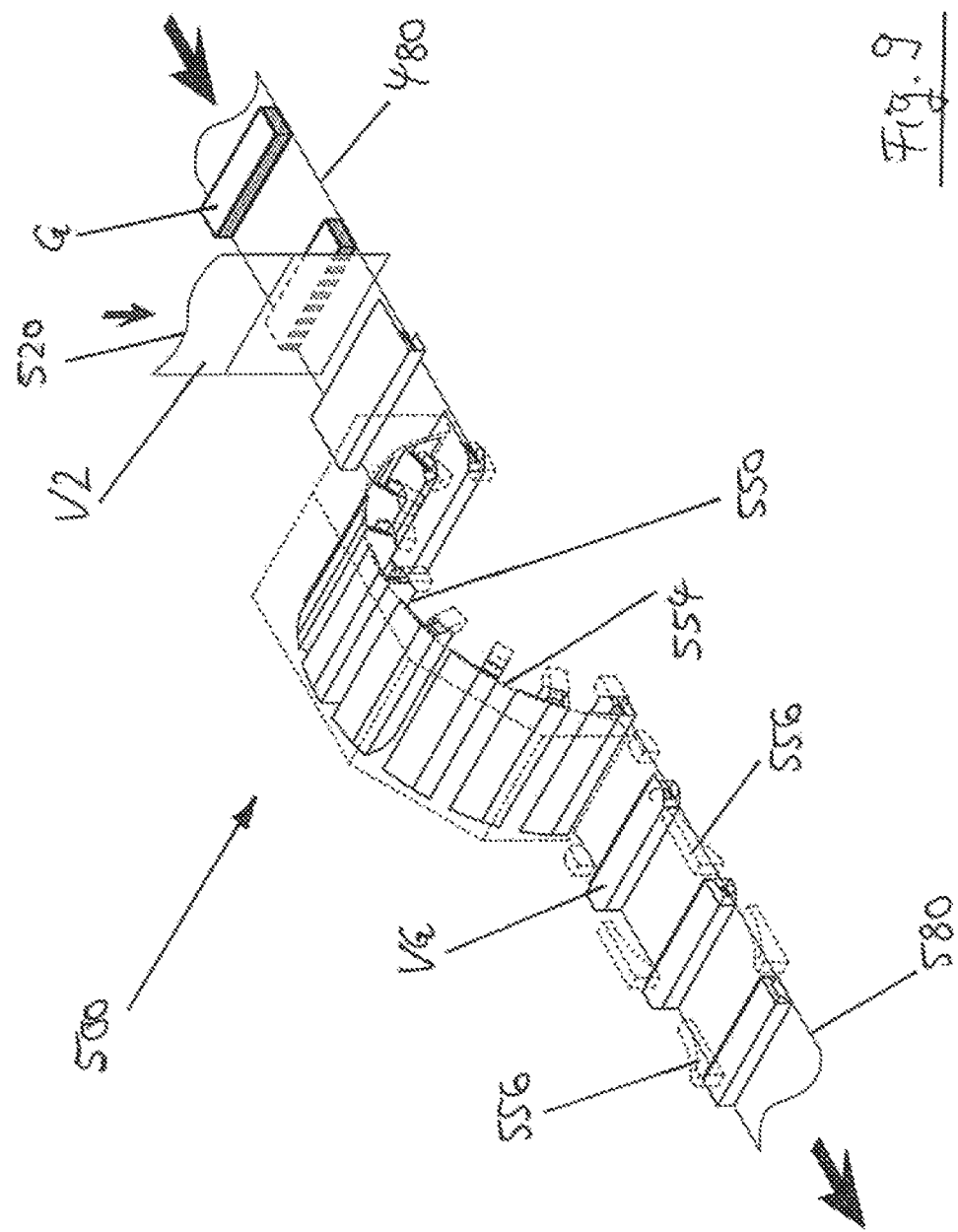

METHOD AND DEVICE FOR PACKING STRIP-TYPE OBJECTS, ESPECIALLY STRIPS OF CHEWING GUM

The invention relates to a method and apparatus for packing strip-like objects, in particular objects suitable for consumption, in particular strips of chewing gum. The invention further relates to a method and an apparatus for producing such individual strip-like objects.

In the prior art there are known methods and apparatuses for producing strip-like objects, in particular sticks of chewing gum or strip-like chewing gums, and methods and apparatuses for packing those strip-like objects. In specific embodiments, in particular packing machines and systems for chewing gums, in particular strips of chewing gum, are known. In this instance, strips of chewing gum having different dimensions are commercially conventional and can be packed by the known machines. There are known on the market in particular relatively wide, long strips having a small thickness (so-called "stick gum") or strips which are narrower and shorter in comparison therewith but which have a greater thickness (so-called "tab gum"). In addition, there are also marketed additional formats for chewing gum sticks or strip-like chewing gums.

Wherever chewing gums or chewing gum sticks or strips of chewing gum are discussed below, this is simply intended to be understood to be by way of example. The present invention relates, besides to chewing gums, to any type of strip-like objects, in particular those objects which are suitable for human consumption. This may also involve, for example, biscuit products or confectionery products and the like. However, it also includes strip-like products which are not intended for consumption such as, for example, medical or pharmaceutical products, suck as diagnosis strips and the like. The important aspect for all such strip-like objects is that the objects are packed individually in a packing material batch and, after a group of such packed individual, strip-like objects are further conveyed and formed, are packed as a group in an additional packing material batch.

In the known methods and apparatuses for packing strip-like objects, substantially larger rectangular slabs rom which the strip-like objects are intended to be formed are generally provided initially. The length of the relatively short sides of the rectangular slabs generally corresponds to the length of a single one of the strip-like objects which are intended to be formed. In the case of the known methods and apparatuses, the individual strip-like objects are subsequently formed from those slabs provided and are subsequently packed individually with a first packing material. In the known machines, those individual packed strips are then typically combined to form a product group, with the group of packed product strips formed then being packed with a second packaging material. In known chewing gum packing machines, typically five, seven or any other number of chewing gum strips which are initially packed individually and separately are further packed in a state stacked in a group in this instance. A plurality of the formed groups packed in this manner can then be further grouped and packed to form suitable sales units.

In known chewing gum packing machines, the relatively large rectangular product slabs are provided in a state stacked in a magazine, are removed from the magazine one after the other and are successively transferred to a conveying device. The conveying device then transports the slabs to a separating station, in which the individual product strips (strips of chewing gum) are formed from the slab, in that the product strips are separated by suitable separating devices successively and continuously from the slab supplied. The conveying device to which the product slabs individually removed from the magazine are transferred is typically formed by a continuously running chain or belt type conveyor. The transferred slabs positioned on the chain or belt type conveyor are accelerated in this instance and generally conveyed to the separating station in the longitudinal direction thereof, where they strike the preceding slab by in particular abutting that preceding slab and colliding with it in the conveying direction. The slabs which are longitudinally one behind the ether in a gapless manner in the conveying direction are advanced by the chain or belt type conveying device and thus supplied to the separating device in which the individual product strips are separated from the foremost slab at the front, narrow end thereof.

In this method, the slab removed from the magazine and transferred to the conveying device is conveyed towards the separating station at a higher speed (so-called overspeed) than that corresponding to the speed at which the individual product strips are separated and further conveyed at the front end of the foremost of the slabs backed up one behind the other. That overspeed is necessary in order to hitch the subsequent slab removed from the magazine to the preceding slab, that is to say, in order to close the gap initially existing between those two slabs in the conveying direction of the chain type conveying device. As soon as that gap has been closed, the slabs are located in a gapless manner in a state backed up one behind the other, wherein they are pushed further forwards in the longitudinal direction by the conveying device which runs at overspeed.

The speed at which the conveying device moves forwards in the conveying direction may therefore be substantially higher in this instance than the speed at which the individual product strips are separated from the slab in the separating device and subsequently conveyed onwards (so-called machine speed). In typical applications, the speed of the conveying device of the slabs may be, for example, 30% or 40% higher than the machine speed. Since the product slabs are backed up in front of the more slowly working separating device and accordingly are only pushed forwards effectively at the speed of the separating device, the more rapidly running chain or belt type conveying device consequently runs through under the product slabs which are backed up. The conveying device accordingly rubs along the underside of the slabs, that is to say, there is friction between the more slowly conveyed product slab and the more rapidly running conveying device. This causes, on the one hand, a material abrasion at the underside of the product slab, which may involve undesirable damage to the relevant surface of the product slab (for example, rubbing marks) and, on the other hand, wear of the transport media, such as, for example, chains or belts, Furthermore, the product abrasion produced also results in contamination of the machine in this region, which subsequently involves an increased need for cleaning.

In addition to the chain or belt type conveying device described, on which the product slabs are supported, a comparable, additional conveying device, which functions in the same manner in principle, may also further be provided in the known machines and is arranged above the product slabs and consequently grips and conveys (so-called overhead conveyor) the product slabs at the upper side thereof. In this instance, the product slab is typically clamped between the lower and the upper conveying device and moved forwards. As a result of the product slabs located One behind the other under back-up pressure (as described above), the relevant slab is consequently gripped from below and from above in this instance, with the conveying devices rubbing along the upper side and the lower side of the slab as a result of their conventional overspeed in relation to the machine speed and consequently producing abrasion of the product slab at the upper side and lower side thereof, which correspondingly results in the above-mentioned problems.

The extent of the abrasion and consequently the extent of the wear of the slabs are also dependent on the quality of the product material. In particular in the e of chewing gums, various materials which have in particular different grades of hardness may be processed. Depending on the material quality, the above-mentioned problems resulting from the friction a corresponding material abrasion are of different magnitudes.

In the known chewing gum packing machines, the above-mentioned separating devices which separate the individual strip of chewing gum from the supplied slab typically have a breaker roller or the like. That breaker roller typically has at its periphery pockets or other suitable receiving members into which the supplied slab is introduced at the front end thereof. By the breaker roller being rotated, this receiving pocket rotates out of the plane of the supply of the slab and breaks off the desired strip from the slab.

For that purpose, the slab is preferably provided at this location with a transversely extending groove which forms a line of weakening in the material of the slab and makes it easier to break off the strip. The radial depth of the receiving pocket of the breaker roller consequently corresponds substantially to the width of the strip to be formed and the radially outer delimitation of the receiving pocket which forms the breaker edge substantially engages in the transverse groove provided in the slab. With a corresponding rotation direction of the breaker roller, the strip of chewing gum formed in this manner is generally pressed away downwards and transferred at that location to a subsequent conveying device. Therefore, the strip of chewing gum is pressed downwards out of the plane of supply of the slab to a lower plane. That operation also typically results in a loading and in particular abrasion and wear of the strip of chewing gum formed, with corresponding contamination of the relevant machine region.

When the slab is supplied to the breaker roller by means of the above-described chain or belt type conveying devices or comparable conveying devices, the slab is supplied to the breaker roller in an intermittent manner to a greater or lesser extent in that the slab collides with the stop in the pocket of the breaker roller with the front end thereof and is then temporarily practically stopped while the strip is broken off by the rotation of the breaker roller until the next receiving pocket is ready to receive the next portion of the slab. During this phase of the short stoppage of the slab, the above-mentioned supply devices (chain or belt type conveying devices) also continue to move continuously and consequently rub on the relevant surfaces of that slab. This also again results in material abrasion with the disadvantages described above.

The above-described, known chewing gum packing machines function at a high speed, with the output previously typically being limited to producing and conveying approximately 2300 articles per minute as a result of the above-described mechanical/physical conditions (one article corresponds to a strip of chewing gum). In the meantime, however, that output is considered to be too low for modern market requirements.

On the basis of the above-described prior art and the disadvantages and problems caused thereby, an object of the invention is to provide machines for packing strip-like objects, in particular strips of chewing gum, which have a higher output. In this instance, an output of, for example, approximately 4000 articles per minute is sought. At the same time, a more protective processing of the products (strips of chewing gum) formed and to be packed is intended to be brought about, that is to say, in particular abrasion, wear and damage, on the one hand, in respect of the products but, on the other hand, also of the machine, are intended to be reduced or prevented, whereby the consequent problems mentioned (contamination, need for cleaning, etcetera) are also intended to be reduced. Furthermore, it is also intended to improve the possibility of processing products with different material qualities, such as, for example, types of chewing gum with a softer quality. Finally, the invention is also intended to provide for improved machines which ensure a higher level of operational reliability, that is to say, in which problems in the course of conveying the products through the machine (for example, product back-up, jams, blockages, etcetera) are prevented and in which the reject rate owing to defective products is reduced.

This object is achieved according to the invention by a method and an apparatus for producing individual strip-like objects, in particular objects suitable for consumption, in particular strips of chewing gum, and by a method and an apparatus for packing those strip-like objects, having the following method steps and features: providing substantially rectangular slabs, from which the strip-like objects are intended to be formed, wherein the length of the shorter sides of the slabs corresponds to the length of a strip-like object to be formed; forming individual strip-like objects from the slabs provided; packing the formed, individual strip-like objects with a first packing material; forming a group of the individual, packed strip-like objects; and packing the formed group of strip-like objects with a second packing material. The step of providing the slabs particularly comprises the following additional method steps and features: producing in the slabs grooves which extend substantially parallel with the shorter sides of the slabs; and controlled supply of the individual slabs in their longitudinal direction successively to the following step of forming the individual strip-like objects in such a manner that each slab adjoins the preceding slab in a positionally precise, gapless manner and without back-up pressure. Furthermore, the step of forming the individual strip-like objects particularly comprises the following additional method steps and features: separating an individual strip-like object from the slab at the front end thereof in the conveying direction by tearing along the foremost groove produced in such a manner that the supplied slab and the separated strip-like object set are substantially in the same plane; and accelerating the separated strip-like object in the conveying direction in order to form a spacing between the individual, successive strip-like objects.

According to the invention, the supply of the individual slabs provided to the separating device is controlled in such a manner that each slab adjoins the preceding slab in a positive-locking, positionally precise and gapless manner, without the slabs being one behind the other in a conveying jam or under back-up pressure. The supply of the slabs to the separating device is therefore controlled in such a manner that a gap which is initially present on the conveying device between two successive slabs as a result of the slabs being supplied to the conveying device is closed in such a manner that the subsequent slab is moved towards the preceding slab without the subsequent slab colliding with the preceding slab. Consequently, the conveying device for supplying the slabs to the separating device does not run continuously according to the invention at a substantially constant speed, in articular a speed (overspeed) which is higher than the speed of the onward conveying after the separating device (machine speed). Instead, the speed of the conveying device for supplying the slabs to the separating device is controlled, that is to say, is alternately increased and decreased, in accordance with the conveying position in which the slab being conveyed is currently located.

According to the invention, the individual strip-like object is further separated, in particular torn, from the slab substantially in a straight direction (that is to say, in the conveying direction), that is to say, the supplied slab and the strip-like object separated therefrom are substantially in the same plane. Unlike in the machines known from the prior art, the individual strip is consequently no longer broken off from the slab and moved out of the plane of supply of the slab, that is to say, no longer displaced or redirected into a different, subsequent conveying plane.

Those steps according to the invention allow a machine output which is higher than the prior art with, at the same time, increased operational reliability and, at the same time, more protective product processing. In a preferred embodiment of the invention, the conveying device for supplying the slabs to the separating device comprises a first and a second conveying device, wherein a first provided slab is transferred to the first conveying device and continues to be conveyed thereby substantially in the longitudinal direction thereof, and wherein a second provided slab following the first slab is transferred to the second conveying device and continues to be conveyed thereby, and wherein a next provided slab following the second slab is subsequently again transferred to the first conveying device and continues to be conveyed thereby. The first and the second conveying devices are arranged and cooperate with each other in such a manner that all the slabs supplied are conveyed on the same conveying path, wherein the two conveying devices are controlled substantially in such a manner that the conveyed slabs are first accelerated after they are supplied to the relevant conveying device and are subsequently braked again, whereby it is brought about that each slab adjoins the slab preceding it in a positionally precise, positive-locking and gapless manner. The conveying devices are formed in particular in such a manner that they convey the slabs substantially without sliding friction, that is to say, without relative movement between the slab and the conveying device.

In another preferred embodiment of the invention, the first and second conveying devices each have at least one conveyor belt on which the slab is supported substantially without friction (that is to say, without relative movement with respect to the conveyor belt). The conveyor belt of each conveying device has in the region of the support of the slab a protrusion (or greater thickness) in such a manner that the slab supported thereon does not touch the conveyor belt of the other conveying device, which belt is arranged beside it. Consequently, the slab being supported on the conveyor belt of the first conveying device cannot slip over the adjacent conveyor belt of the second conveying device, which belt may have a different speed. In that manner, abrasion and wear of the slabs conveyed are prevented to the greatest possible extent because there is substantially no relative movement between the affected conveying device (conveyor belt) and the slab and because there is no contact and consequently no friction with respect to the other conveying device (conveyor belt) not affected by the slab.

In a further preferred embodiment of the invention, the separating station which follows the conveying device formed by the first and second conveyor belts has a plurality of additional, successive conveying devices which grip and continue to convey the supplied slabs and the individual strip-like objects formed therefrom, wherein the conveying speeds of those successive conveying devices increase in the conveying direction. In this instance, a plurality of, for example, three, roller pairs arranged in a mutually parallel manner are particularly arranged one behind the other in the conveying direction, wherein the rotation speed of the successive roller pairs increases in the conveying direction, and wherein the spacing in the conveying direction between the axes of the successive roller pairs is substantially equal to the width of the individual strip-like object to be formed in the conveying direction. In this embodiment, the first roller pair grips the supplied slab and the subsequent roller pairs separate the strip-like object from the slab as a result of the speed increase in relation to the fixer roller pair.

In the conveying direction downstream of the plurality of roller pairs, there is preferably provided a star-like conveying device which rotates about a rotation axis arranged parallel with the rotation axes of the roller pairs. The star-like conveying device grips the strip-like object which is separated from the slab by the roller pairs and accelerates it in the conveying direction in order to form a defined, uniform spacing between the individual successive strip-like objects. This spacing is necessary in order to supply the strip-like object to the subsequent first packing station.

As a result of the cooperation according to the invention of the separating station with the conveying devices in order to supply the slab provided to the separating station and the construction of the separating station and the supply devices according to the invention and the cooperation of those components with the additional components for packing the strip-like objects formed with a first packing material, in order to form a group of the individual packed strip-like objects and to pack the formed group of strip-like objects with a second packing material, it is generally possible to achieve a higher machine output than in the prior art (for example, approximately 4000 articles per minute), with the products being processed at the same time in a more protective manner and with a higher level of operational reliability than in the case of machines of the prior art.

Additional details and advantages of the invention will be appreciated from the following detailed description of an embodiment in conjunction with the appended drawings, in which:

FIG. 9 is a perspective view of the group packing devices.

Figure 1:
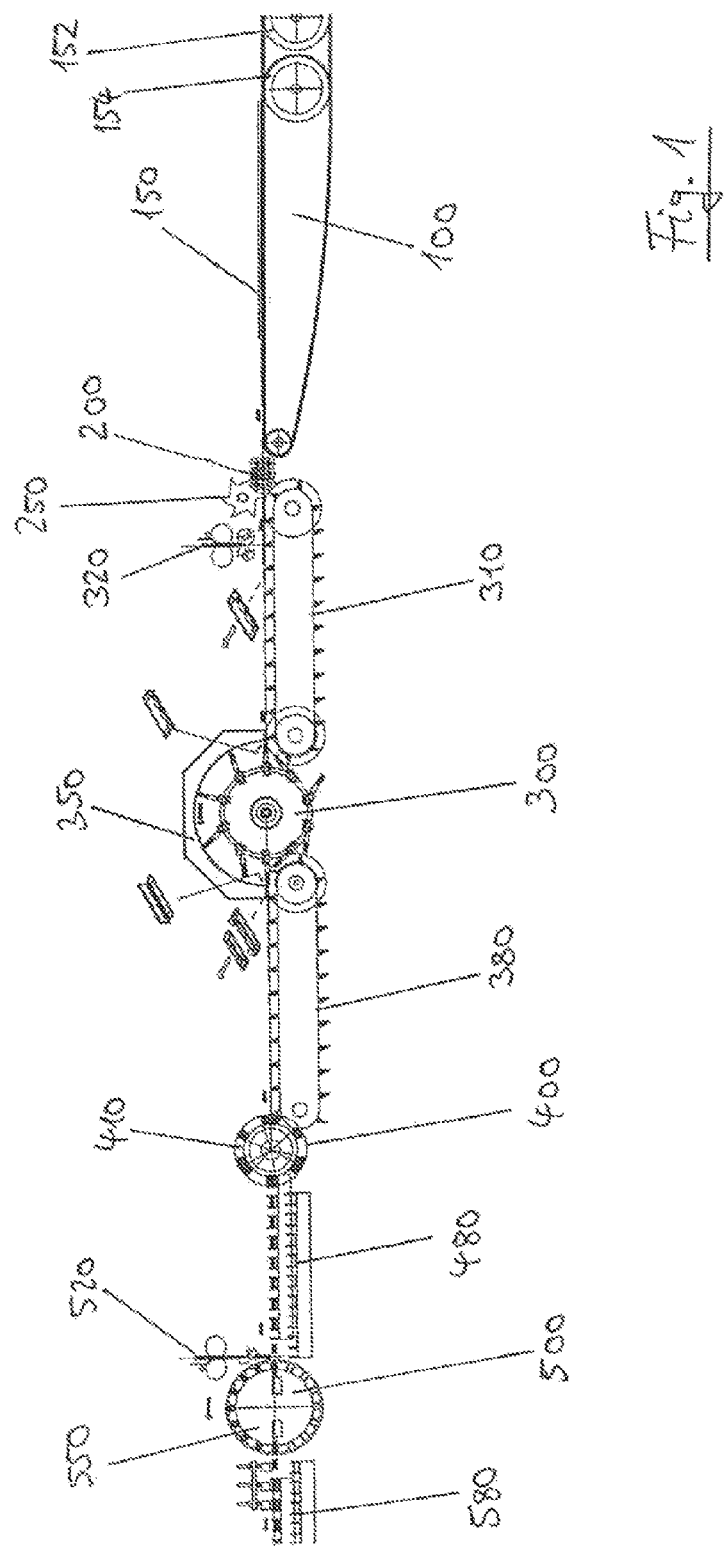
FIG. 1 is a schematic side view of the entire packing machine according to the invention.

FIG. 1 is a schematic general view of a chewing gum packing machine. In this illustration, the product to be packed passes through the machine from right to left, wherein a slab is provided and supplied at the right-hand end of that conveying path, from which slab the individual strips of chewing gum are intended to be formed, and wherein the grouped and packed strips of chewing gum are discharged for further processing at the left-hand end of that conveying path. It is self-evident that a product flow is also possible from left to right in accordance with the application and construction of the machine.

In this instance, a chewing gum material slab P is first provided in the slab provision and supply devices 100 and is then supplied to the separating devices 200, in which the individual strips of chewing gum S are formed from the slab P. The strip packing devices 300, in which the formed, individual strips of chewing gum S are packed in a first packing material V1, adjoin the separating devices 200. The strips of chewing gum VS which are packed and formed in this manner are then supplied to the group forming devices 400, in which groups G of the packed strips of chewing gum VS are formed. The groups G formed in this manner are then finally supplied to group packing devices 500, in which the formed groups G of the packed strips of chewing gum VS are packed in a second packing material V2. The strip groups VG packed and formed in this manner are then discharged for further processing, for example, for additional grouping and/or packing operations in order to form suitable sales units.

As FIG. 1 shows, the chewing gum product to be packed passes through the machine from right to left substantially in a plane on a uniform, linear conveying path without lateral redirections or redirections of the conveyed product in terms of height occurring in this instance. The product is already thereby loaded to a small extent and processed in a protective manner. The individual components of the packing machine shown as an overview in FIG. 1 are described in detail below with reference to the additional drawings. The arrows illustrated in the drawings indicate the significant movement or conveying directions.

Figure 2:
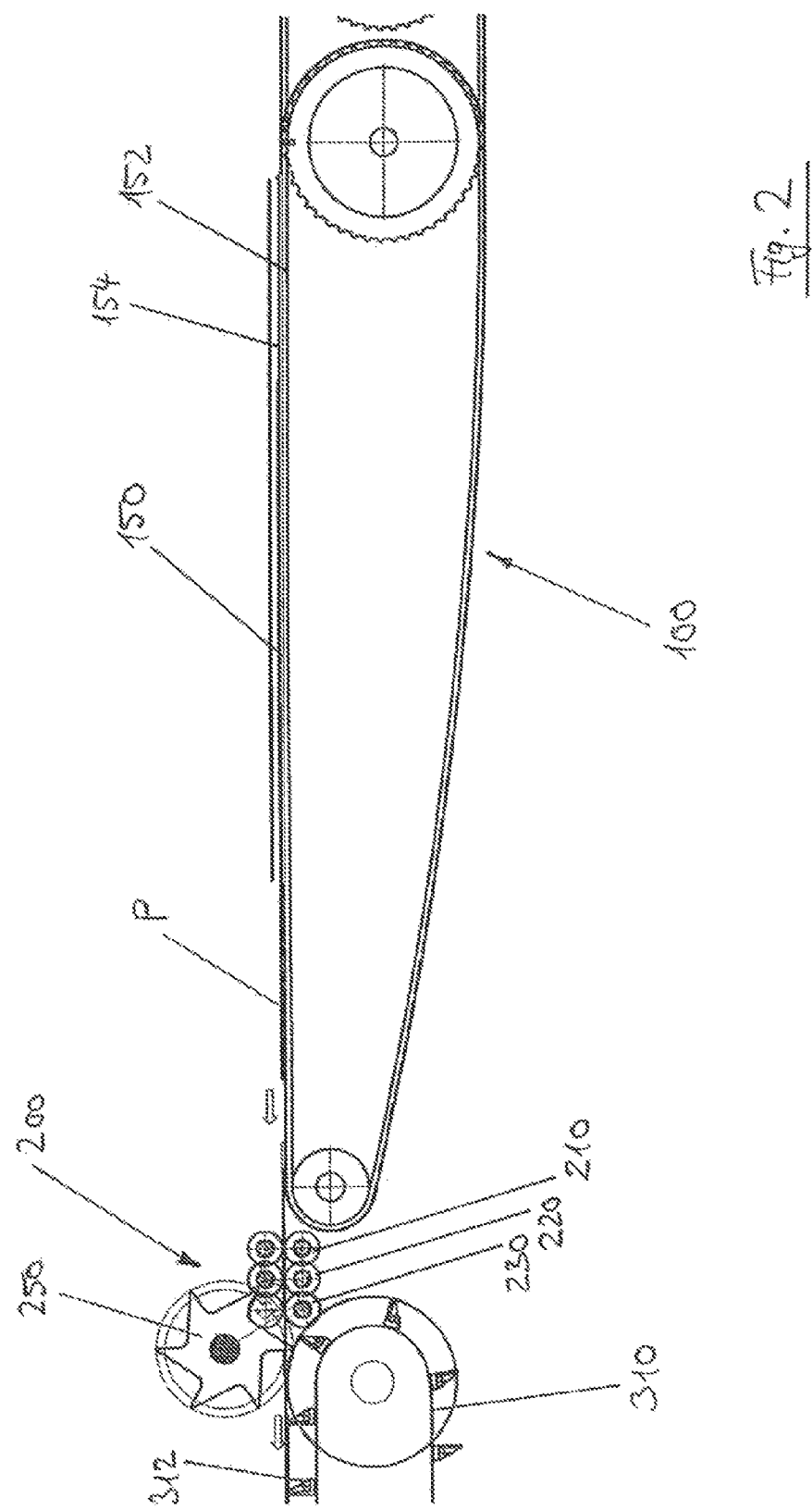
FIG. 2 is an enlarged side view of the slab supply devices and the separating devices of the packing machine according to the invention.
Figure 3:
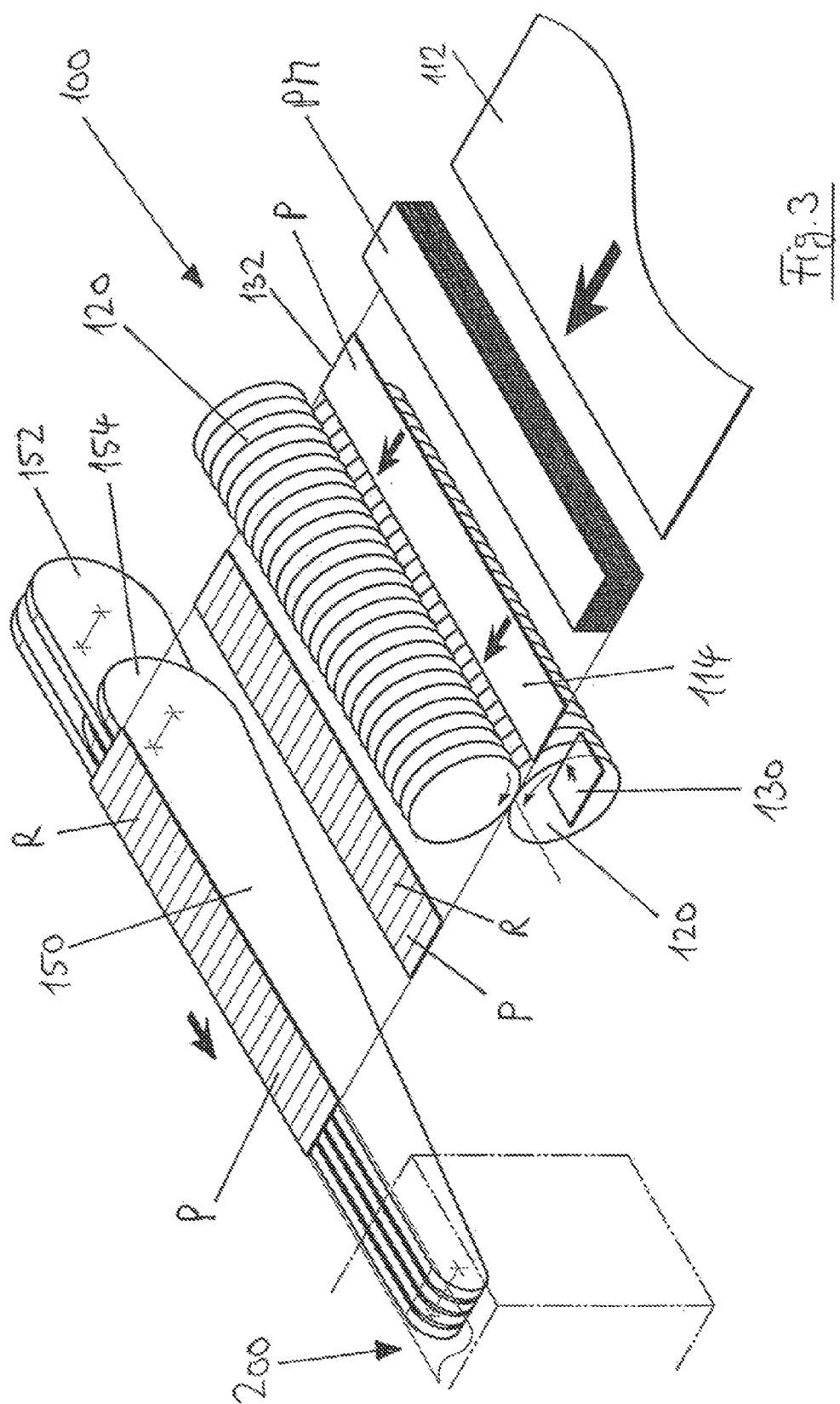
FIG. 3 is a perspective view of the slab provision and supply devices.
Figure 4:
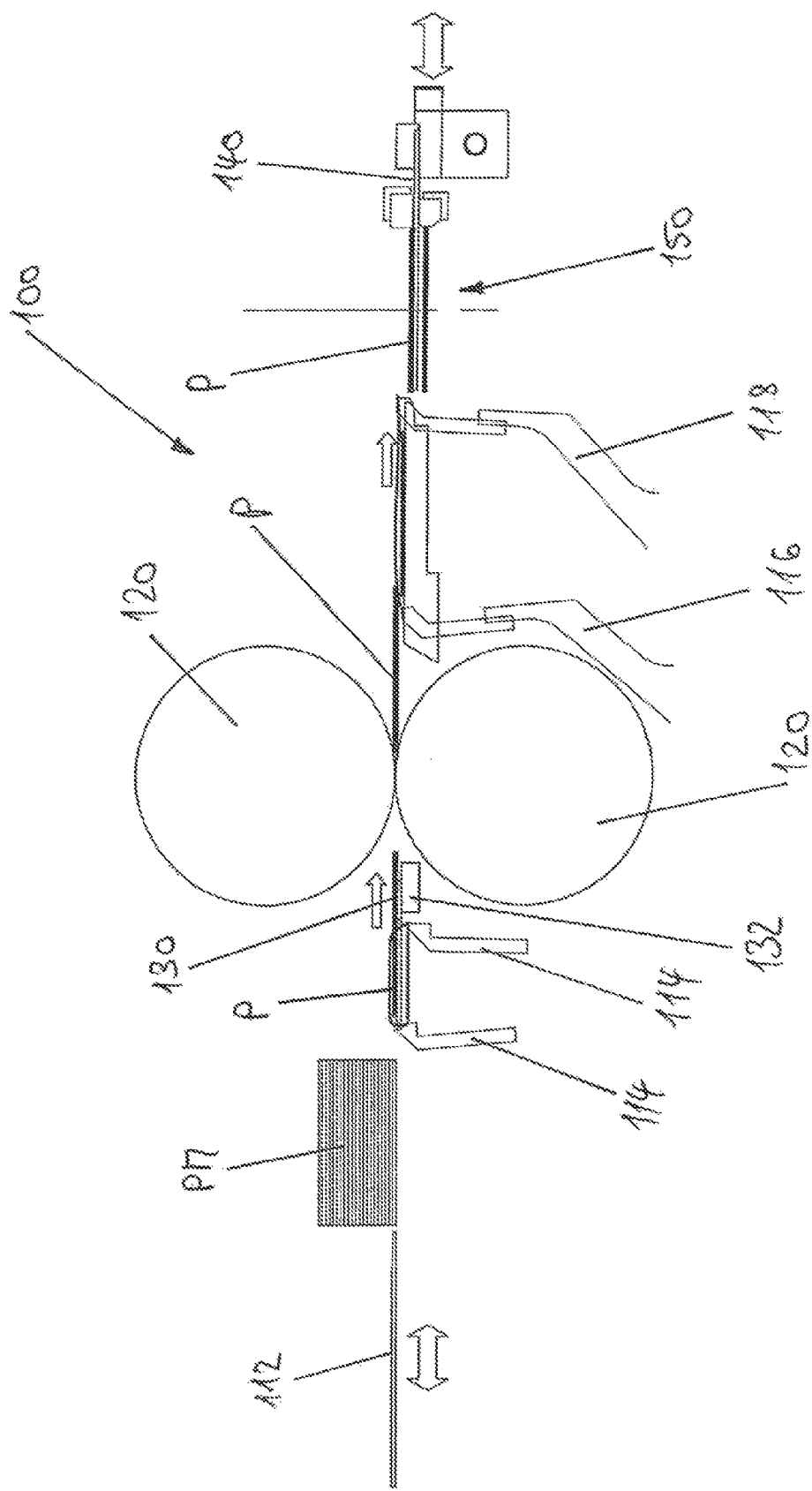
FIG. 4 is a side view of the slab provision and supply devices from FIG. 3 from the rear.

FIGS. 2, 3 and 4 are different views of the slab provision and supply devices 100. The slabs P formed from the chewing gum material are provided in the form of the stack PM in a magazine. That magazine may be filled with new slabs P manually or automatically. The lowermost slab P is pushed out of the stack PM with a first slab pushing device 112 and pushed with a second slab pusher 114 between two cutter rollers 120 which are arranged parallel with each other and which rotate in opposition. The cutter rollers 120 grip the slab P and discharge it behind the rollers 120 again. The cutter rollers 120 have, at the longitudinal axis thereof and/or at the periphery thereof, a plurality of blades which produce grooves R in the slabs P as a result of the rotation of the rollers. The axial spacing between two adjacent blades consequently corresponds to the width of a strip of chewing gum S to be formed. The number of blades consequently corresponds to the number of strips S to be formed from a slab P plus one. The blades arranged at the longitudinal axis or at the periphery of the rollers 120 produce the grooves R in the slab P in such a manner that they do not cut through the slab P but instead produce groove-like indentations in the slab at the upper side and/or the lower side thereof in such a manner that a thin material layer still remains between the grooves R at both sides.

In the conveying direction downstream of the cutter rollers 120, the grooved slabs P are then taken up by the additional slab pushing devices 116 and further conveyed and, finally, transferred to a conveying device 150 which conveys the slab P to the separating devices 200. As can be seen from FIGS. 3 and 4, the slabs P are moved substantially in a direction perpendicular to the longitudinal direction thereof until the transfer to the conveying device 150. The slabs P are then further conveyed in the longitudinal direction thereof by the conveying device 150 and supplied to the separating devices 200.

FIG. 4 is a side view of the slab provision and supply devices 100 in a viewing direction from obliquely above and to the right towards an oblique position below and to the left in FIG. 3. In FIG. 4, consequently, the conveying device 150 conveys the slab P supplied to it from the left further in a direction directed perpendicularly into the plane of the drawing.

As can be seen in FIGS. 3 and 4, devices 130 for orientating the slabs P may additionally be provided in the conveying direction upstream of the cutter rollers 120. Those orientating devices 130 push the Slab P in the region upstream of the cutter rollers 120 against a stop 132 which is arranged flush with the outermost, right-hand blades of the rollers 120 (when viewed in the conveying direction of the slab P in FIG. 3). If a slab P is longer with respect to its dimensions than the total width of the cutter rollers 120, it is then possible for a remaining portion of the slab P to project outwards (that is to say, towards the left in FIG. 3) only at the outermost, left-hand end of the slab P (when viewed in the conveying direction of the slab P in FIG. 3) with respect to the outermost left-hand blades of the rollers 120. That projecting slab portion may then be cut off during passage through the cutter rollers 120 by the outermost left-hand blades so that the slab P has, following the passage through the cutter rollers 120, a length which precisely corresponds to a whole-number multiple of the strips S to be formed without an edge portion which may be narrower than a regular strip s to be formed remaining at one of the edges thereof.

That edge cutting must be generally carried out so that only strips S of the same size are always produced and further conveyed during the onward conveying of the slab P and the subsequent formation of the individual strips S. Otherwise, the projecting narrower edge portion could produce a strip S which is too narrow, which could result in problems in the case of the subsequent additional process Steps.

The orientating devices 130 may, for example, be formed either by a pushing device which grips the slab P at the short edge thereof (located at the bottom left-hand side in FIG. 3) and pushes it against the stop 132 in the longitudinal direction thereof. Alternatively, the orientating devices 130 may be formed by an orientating plate, on which the slab P comes to rest and by which the slab P is again pushed against the stop 132 in a frictionally engaged manner. Those orientating devices 130 may also be provided because the slab stack PM typically becomes slightly displaced in a longitudinal direction of the slabs P as a result of the movements or vibrations inherent to the machine, so that the slab P pushed out of the stack PM by the first slab pusher 112 is not initially precisely orientated with respect to the cutter rollers 120. As a result, the orientating devices 130 therefore ensure centering of the slab P in relation to the cutter rollers 120. If the slab P has the correct dimensions from the outset and the above-described edge cutting is therefore dispensable, the orientating devices 130 may also be provided only for centering the slab P in relation to the cutter rollers 120.

As FIG. 4 further shows, it is possible to provide, in the region of the slab supply devices 150, an additional pushing device 140 which is used initially to take up the slab P before the transfer to the conveying medium of the conveying devices 150 above the conveying medium and only then to deposit the slab P on the conveying median of the conveying devices 150 by the pushing device 140 being withdrawn.

The pushing device 140 may comprise a plate or a metal sheet, onto which the slab P is pushed by a pushing device 118 again in the direction perpendicular to the longitudinal direction thereof and is deposited at that location, whilst the pushing plate 140 is located in a position above the conveying medium of the slab conveying devices 150. As soon as the conveying medium of the slab conveying devices 150 is ready, the depositing pushing member 140 is withdrawn (that is to say, towards the outer right position in FIG. 4), whereby the slab P falls down onto the conveying medium of the slab conveying devices 150. The height of the drop may be, for example, approximately from 2 to 3 mm in this instance. With this device, the supply of the slabs P to the slab conveying devices 150 may be decoupled in terms of time from the movement of the slab conveying devices 150 and the slab P is correctly deposited on the conveying devices 150 only when they have moved into the correct position, in which the slab P can be taken up.

FIG. 3 shows the conveying devices 150 which are used to supply the slabs P successively to the adjoining separating device 200 in the longitudinal direction thereof. Those slab supply devices 150 particularly comprise two conveying devices which are arranged beside each other, in particular two conveyor belts or two conveyor belt pairs 152 and 154. The first conveyor belt pair 152 is used to take up a first slab P supplied from the side (as described above) and then to convey it onwards substantially in the longitudinal direction thereof. The second conveyor belt pair 154 which corresponds to the first conveyor belt pair 152 in terms of its function serves to take up a second slab P which follows the first slab P (and which, as described above, is again supplied from the side) and then again to convey it onwards substantially in the longitudinal direction thereof. Following the second conveyor belt pair 154, the first conveyor belt pair 152 again takes up a next slab P which follows the previously mentioned second slab P and which is again supplied from the side and again conveys it in the longitudinal direction thereof to the separating device 200. The conveyor belts 152, 154 have suitable carriers which adjoin the slab P at the rear end thereof in the conveying direction, respectively, and carry the slab P during movement of the conveyor belt. The slabs P are therefore supported on the conveyor belts 152, 154 in such a manner that they are moved by the conveyor belts without friction, that is to say, there is no relative movement between the slab P and the conveyor belt 152 or 154 associated therewith, respectively, as has already been explained in the introduction.

The conveyor belts or conveyor belt pairs 152, 154 are particularly constructed in such a manner that they have a projection or a greater thickness in the region in which the slab P is supported. As already explained above in connection with the depositing pusher 140 (see FIG. 4), each conveyor belt 152, 154 only has to be moved into the correct position in which it can take up the slab P. Consequently, this is the position in which the region of the greater belt thickness is located under the depositing pusher 140 so that the slab P falls on that projecting belt portion when the depositing pusher 140 is withdrawn. At the same time, a region of the other conveyor belt is in that region under the depositing plate 140 which has a normal or smaller thickness. The slab P supported on the projecting region of the first belt pair 152 thereby cannot come into contact with the second belt pair 154 in this portion. The slab P supported on the projecting region of the first belt pair 152 can consequently be moved forwards without touching the second belt pair 154 and in particular rubbing along it. In that manner, rubbing of the slab P on the conveyor belt is generally prevented and as a result material abrasion from the slab P is prevented.

Whereas the successive slabs P are consequently conveyed in principle on the same conveying path, they are alternately conveyed by the first belt pair 152 and the second belt pair 154 in the manner described above. The movement speed of the conveyor belts is controlled by suitable control devices in such a manner that the slabs P are first accelerated and subsequently braked again after the slabs P are transferred in the region of the depositing pusher 140. In that manner, the successive slabs P which are initially located with spacing from each other in the longitudinal direction thereof on the conveyor belts 152, 154 close up together, that is to say, each successive slab closes up in a positive-locking, positionally precise and gapless manner upstream of the separating device 200 with respect to the slab preceding it, respectively. Consequently, as a result of the slabs P being conveyed in a controlled manner on the conveyor belts 152, 154, the slabs P are therefore located without back-up pressure one behind the other in a gapless manner, that is to say, the slabs P supplied from the rear in the conveying direction do not strike the preceding slabs P and do not push them forwards from the rear.

Since, as already explained in the introduction, the conveying devices 152, 154 do not move further continuously and therefore in particular do not slip under the slabs P which are backed up, but instead supply the slabs in a controlled and cyclical manner, the slabs P are conveyed in this phase in a particularly protected manner, that is to say, there are no loads imposed on the slabs P by relative speeds between the conveying medium (conveyor belts) and slab P, whereby abrasion, wear and damage in respect of the slabs and the machine are prevented.

In this embodiment having two conveyor belts or conveyor belt pairs 152, 154, consequently, a decoupling of the removal of the slabs P from the magazine PM and the deposit of the slabs P on the conveying devices 150 or 152, 154 from the supply of the slabs P to the subsequent separating device 200 can be brought about in terms of time. Whilst the separating device 200 functions continuously and withdraws the slabs P from the slab supply devices 150, the devices 100 for providing and supplying the slabs P to the conveying devices 150 (that is to say, transfer of the slabs P to the conveyor belts 152, 154) function discontinuously in a cyclical manner.

The two conveyor belts or conveyor belt pairs 152, 154 are driven by an electric motor, in particular a highly dynamic, precisely controllable servomotor, respectively, wherein the servomotors of the two conveyor belts 152, 154 function independently of each other and drive those conveyor belts separately from and independently of each other. The characteristic of the servomotor drives is preset by means of suitable software. The conveyor belts 152, 154 and in particular the carriers fitted thereto may have, in addition to encoding devices (encoders) integrated in the servo drives, additional encoding and/or sensor devices which cause the position or the conveyor belts or their carriers to be known precisely at all times, which can used for correctly controlling the servo drives. As already described above, that control causes one of the conveyor belts 152, 154 to stop whilst it takes up the slab P, that is to say, while the slab P arriving from the cutter rollers 120 is transferred laterally thereto. The control particularly further causes the other of the two conveyor belts 152, 154 to convey the preceding slab P in the direction towards the separating device 200 during this time. The carrier devices of that last conveyor belt then run on or back to the position in which the next slab P is again transferred to that conveyor belt. At the same time, the other conveyor belt again runs forwards to the separating device 200 with the preceding slab P arranged thereon. The control also causes the relevant conveyor belt to move in such a manner that the relevant slab P adjoins the preceding slab P in a gapless and positionally precise manner but without any impact and without back-up pressure. The conveying device 150 is consequently a multiple-channel conveying device; therefore, in the present embodiment (FIG. 3) in particular a two-channel conveying device, in which each belt or each belt pair 152, 154 forms a channel and wherein the two channels are driven in a coordinated and controlled manner but so as to be independent of each other. It is self-evident that a different number of channels may also be provided in accordance with the application and the embodiment.

Figure 5:
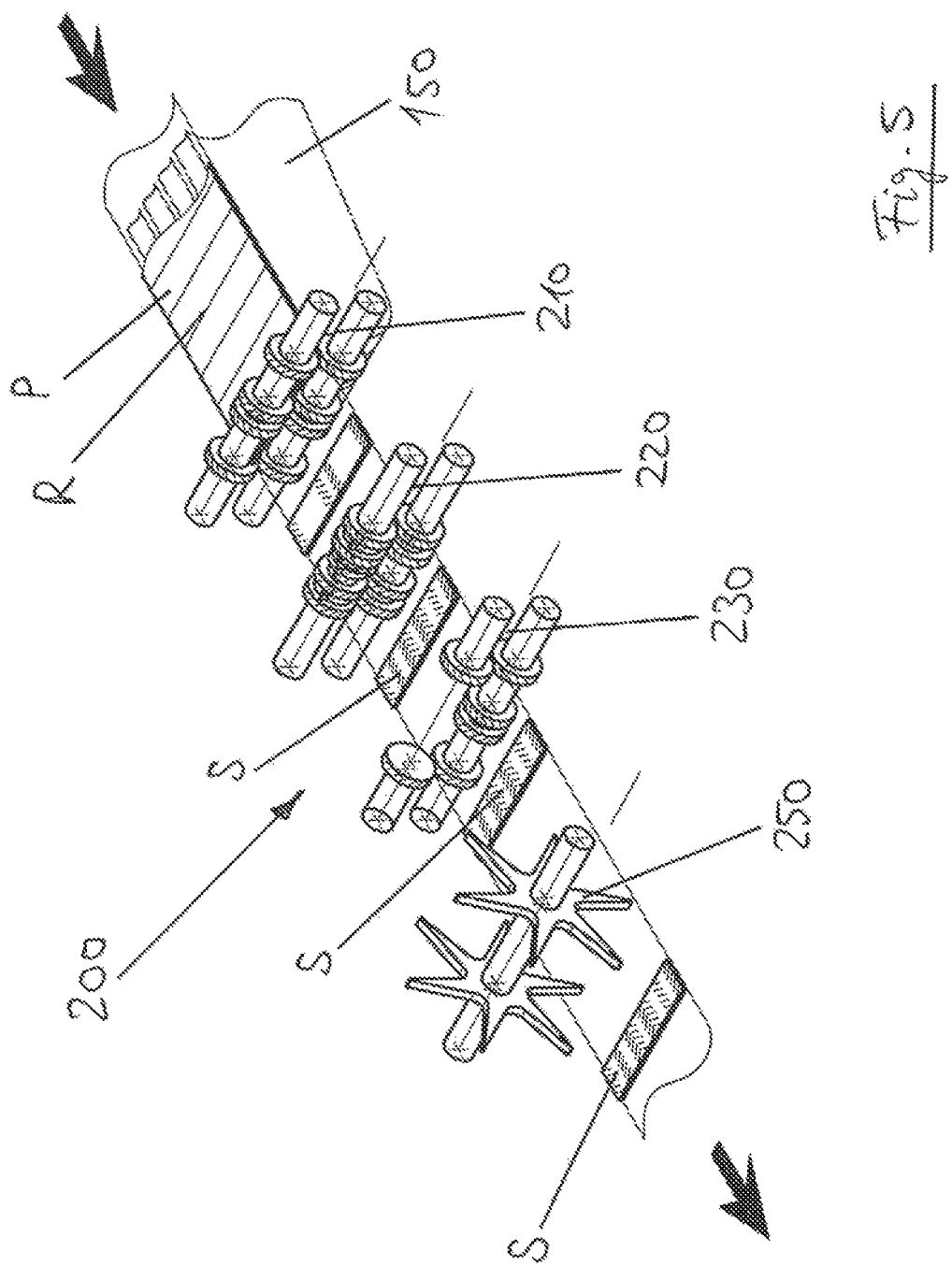
FIG. 5 is a perspective, exploded view of the separating devices.

As FIGS. 2 and 5 particularly show, the separating devices 200 for forming the individual strip-like objects S from the slabs P adjoin the slab supply devices 150. The separating devices 200 comprise in particular devices for separating a single strip-like object (strip S) from the slab at the front and thereof in the conveying direction by being torn off along the foremost groove R produced in the slab P in such a manner that the supplied slab P and the separated strip S are substantially in the same plane. The separating devices 200 further comprise devices for accelerating the separated strip S in the conveying direction in order to form a defined spacing between the individual successive strips S.

As FIG. 2 shows, the separating devices 200 particularly comprise three roller pairs 210, 220, 230 which are arranged parallel with each other and which are arranged one behind the other in the conveying direction and engage one in the other in a suitable manner. Each of the roller pairs grips the supplied slab P or the product strips S formed therefrom and conveys it/them onwards in that each roller pair takes up the product between the two rollers thereof which rotate counter to each other. As may be seen in FIG. 5, the rollers of each roller pair 210, 220, 230 have peripheral surface regions by which the product is gripped. The roller surfaces are typically provided in those regions with a structure by means of which the product passing through can be gripped, wherein that structure can become introduced into the product material to a greater or lesser depth in accordance with the material quality of the product being conveyed. Chewing gum materials are typically so soft that the structured roller surfaces leave behind a corresponding structure or pattern on the surface of the product passing through. That structure on the chewing gum strips S is apparent in FIG. 5 downstream of the roller pairs 210, 220, 230, respectively. In order to make these circumstances clear, FIG. 5 shows an exploded view of the separating devices 200 and in particular the arrangement of the roller pairs 210, 220, 230. in comparison, FIG. 2 shows the normal arrangement of those components inside the machine.

The spacing between the axes of the successive roller pairs when viewed in the conveying direction is substantially the same as the width of the chewing gum strip S to be formed in the conveying direction. In particular, the spacing between the axes of the roller pairs must have such dimensions in the conveying direction that the strip S conveyed and released by a first roller pair can be gripped by the next, following roller pair and again conveyed onwards.

The rotation speed of the roller pairs 210, 220, 230 increases in the conveying direction. As FIG. 5 shows, the slab P supplied by the slab conveying devices 150 is gripped by the first roller pair 210. In this instance, there may be provision for the rotation speed of the rollers of the first roller pair 210 to substantially correspond to the speed of the supply of the slab P so that the slab P is taken up and withdrawn by the first roller pair 210 from the supply devices 150 at a constant speed. The subsequent, second roller pair 220 rotates at a greater speed relative to the first roller pair 210. This causes the rollers of the second roller pair 220 to separate, in particular tear off, a strip S at the front end of the slab P along the foremost groove R, since the conveying speed is increased by the second roller pair 220, that is to say, the product conveying movement is accelerated.

The third roller pair 230 again has a higher rotation speed than the preceding second roller pair 220, whereby the strip S which runs through the third roller pair 230 is further accelerated in the conveying direction. In that manner, the spacing between the individual strips S in the conveying direction is successively increased during the passage through the roller pairs 210, 220, 230.

In an alternative embodiment, the first roller pair 210 may already have a rotation speed, that is to say, conveying speed, which is greater than the speed of the supply of the slab P via the slab conveying devices 150 to the firs: roller pair 210. In this instance, the product strip S is already separated from the slab P by the first roller pair 210 along the foremost groove R.

According to the present invention, it is significant that the chewing gum strips S separated from the slab P are torn off in the conveying direction without the strips S formed being redirected into a different conveying plane in this instance. The slab P supplied and the strip S separated therefrom are therefore substantially located in the same plane. As already explained in the introduction, the strips S were broken off from the slab P in machines from the prior art by means of a breaker roller or the like and redirected out of the plane of supply of the slab P. In the case of a corresponding rotation. direction of the breaker roller, the strips S were pressed away in the known machines in particular downwards into a lower plane, in which the strips were then conveyed onwards. The prevention according to the invention of a deflection or redirection oi the strips S formed consequently ensures a protective processing of the product in this region, wherein in particular abrasion and damage in respect of the product are prevented. The construction according to the invention further ensures a higher level of operational reliability in that product back-ups and blockages of the machine are prevented in this region.

Figure 6:
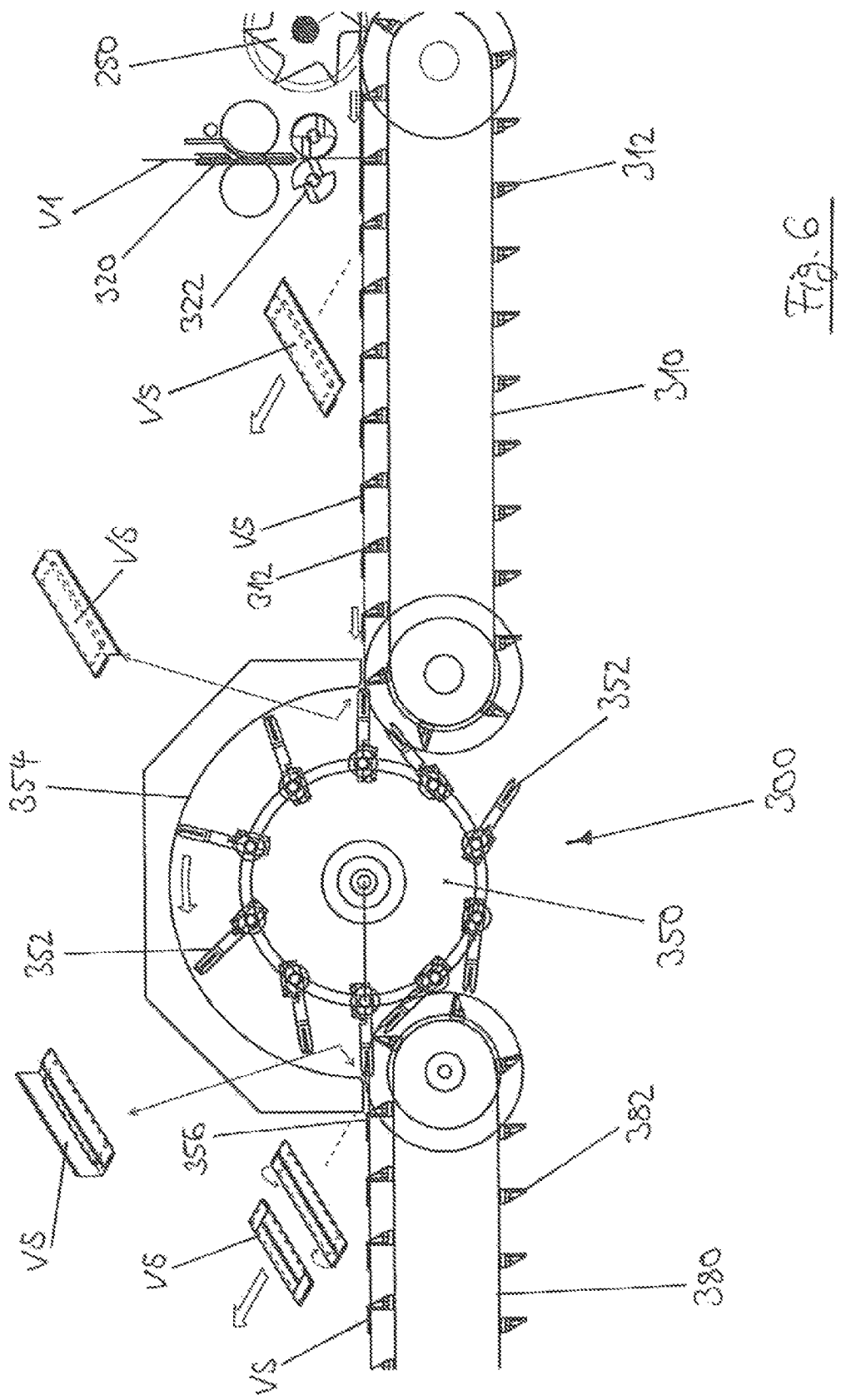
FIG. 6 is a side view of the strip packing devices.

As may further be seen in FIGS. 2 and 5, a star-like conveying device 250 is arranged in the separating devices 200 downstream of the plurality of roller pairs 210, 220, 230 in the conveying direction. That star-like conveying device 250 rotates about an axis which is arranged parallel with the axes of the preceding roller pairs, wherein the rotation speed of the conveying star-like member 250 is again increased, however, in relation to the rotation speed of the preceding rollers. In that manner, the conveying star-like member 250 further accelerates the strip S again in the conveying direction, whereby the spacing between the successive strips S is again increased in this instance. In this instance, in particular a spacing is formed between the successive strips S, which spacing corresponds to the pitch, that is to say, the spacing of the individual successive carriers of the subsequent conveying devices, with which the strip S is further conveyed to the next station. This situation is illustrated in FIG. 6 at the right-hand edge of the illustration.

As can be seen in this instance, the separating and conveying star-like member 250 transfers the individual formed chewing gum strips S to a first strip conveying device 310, which has carriers 312 for each strip S with a fixed, predetermined spacing. Consequently, the separating star-like member 250 transfers the strips S at a speed and with a spacing from each other which corresponds to the speed and the spacing of the individual carriers 312 of the strip conveying device 310, to the first strip conveying device 310. The first strip conveying device 310 may be formed by suitable conveying means, for example, belt or chain type conveying devices having carriers 312 which are fitted thereto and which grip the product strip S and further push it forwards.

The strip conveying device 310 then transports the chewing gum strip S to a first packing material supply device 320. Here, the strips S are pushed into a prepared curtain comprising a first packing material V1. When the strips S are conveyed onwards by the carriers 312, the packing material V1 is then placed around the strip S, wherein cutting devices 322 provided on the packing material supply device 320 cut off the packing material after a specific advance length or discharge length. A packing material portion which is loosely placed around the strip S when the strip 53 continues to be conveyed is thereby produced for each strip S. Following the first packing material supply device 320, the strip S is consequently partially wound in the portion of the packing material, as FIG. 6 schematically illustrates to an enlarged scale above the conveying path (partially packed strip VS). So that this trip VS which is initially partially wound in packing material is completely wound in the packing material, folding devices 350 for the packing material are subsequently provided downstream of the onward conveying. Thus, the partially packed strip VS is transferred front the first strip conveying device 310 into a slotted drum or folding drum 350. That slotted drum 350 has in a suitable manner leading and/or trailing slot-like receivers 352. The partially packed strip VS is pushed into a receiver 352 horizontally and turned through 180° by a rotation of the folding drum 350 and a corresponding rotation of the receiver 352, respectively. The receiver 352 runs radially outwards along an inner wall 354 of the slotted drum 350, which inner wall acts as a folding face. The packing material portion of the product strip VS is thereby folded through 90°, which packing material portion initially projects horizontally out of the receiver 352, as FIG. 6 illustrates on the right above the slotted drum 350 (pre-folding).

When the receiver 352 has reached the opposite position which is rotated through 180° as a result of the drum 350 being rotated (cf. the illustration of the partially packed strip VS on the left above the drum 350), the strip VS is pushed out of the receiver 352. It is again guided past a folding face of the folding drum 350 in such a manner that the packing material portion initially still projecting by 90° from the partially packed strip VS is folded down onto the strip VS by an additional 90° (as illustrated on the left in FIG. 6 beside the folding drum 350—finish folding). In order to achieve this, the partially packed strip VS is removed from the receiver 352 when the receiver 352 of the slotted drum 350, is in the position rotated through 180°by means of a second strip conveying device 380 and then conveyed onwards. To that end, the strip conveying device 380 again has suitable carriers 382 which engage in the receiver 352 in such a manner that they push the partially packed strip VS out of the receiver 352 and subsequently further convey it towards the folding drum 350. Downstream of tie folding drum 350, suitable folding devices (folding switches) 356 are subsequently further provided in the region of the second strip conveying device 380 and bring about lateral folding of the laterally protruding packing material portions on the strip VS (lateral folding). In accordance with the type of folding, those folding switches may also be in the first strip conveying device 310. Those laterally protruding packing material portions are consequently folded through 180°onto the strip VS so that, in the end, a completely packed strip VS is provided, as schematically illustrated at the extreme left-handed end of the conveying path of FIG. 6.

As mentioned above, the individual chewing gum strip S is consequently completely wound fill a portion of the packing material V1, which portion is provided in the packing material supply device 320. In typical embodiments, that device comprises a servo-driven unrolling of the packing material strip with web edge control for lateral correction of the packing material. The packing material supply or discharge device 320 may further comprise a cam-controlled packing material discharge (servo drive with cam profile) and a positionally synchronous feed of the packing material. Finally, the packing material supply device 320 also comprises a cam-controlled cutting station 322 (servo drive with cam profile) for a positionally synchronous feed of individual packing material portions for each strip S. The cutting station 322 may be formed by one or two rotating cutter rollers and optionally a fixed counter-blade, wherein various packing material guiding and cutting operations can be produced. The packing material discharge device or packing material supply device 320 and the cutting station 322 may be constructed so as to be displaceable upwards and be intended to be opened in order to carry out necessary maintenance operations and to be able to rectify any malfunctions.

Figure 7:
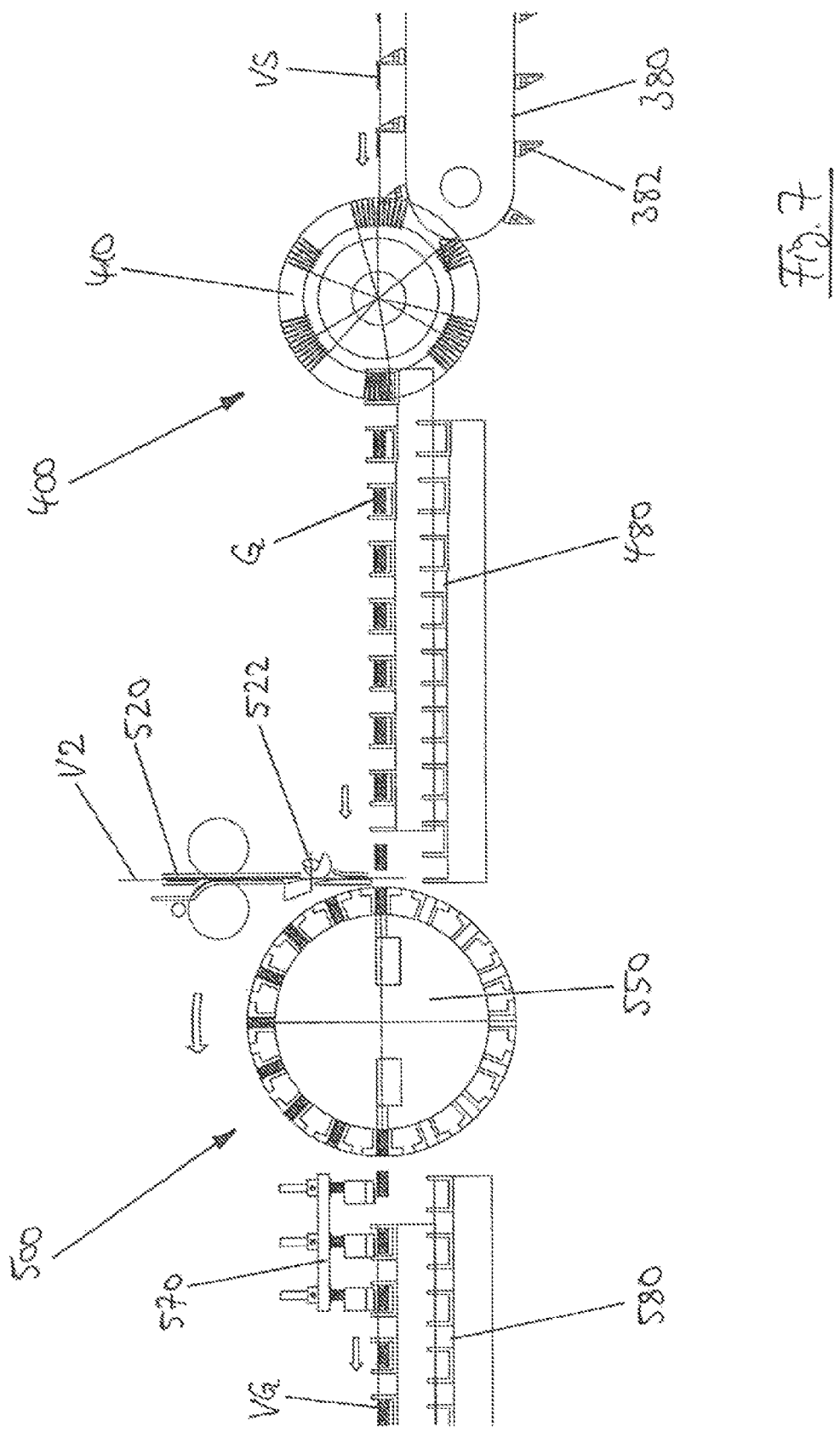
FIG. 7 is a side view of the group forming devices and the group packing devices which adjoin them.

The devices 400 for forming groups G of the individual packed strip-like objects VS then follow in the subsequent process sequence of the packing machine (cf. FIGS. 1 and 7). In the embodiment illustrated in the drawings, those group forming devices 400 are devices for forming a stack of a plurality of product strips VS located one above the other. In another embodiment which is not illustrated in the drawings, the group forming devices may alternatively be constructed in such a manner that a plurality of product strips are beside each other. In still another embodiment, the group forming devices may also be provided in such a manner that a plurality of stacks of individual strips located one above the other are arranged beside each other. Those different embodiments of the group forming devices may be combined and constructed in a variable and modular manner with the preceding above-described machine members and components, whereby extremely varied group sizes, group forms and packing styles can be produced for different sales units desired.

Figure 8:
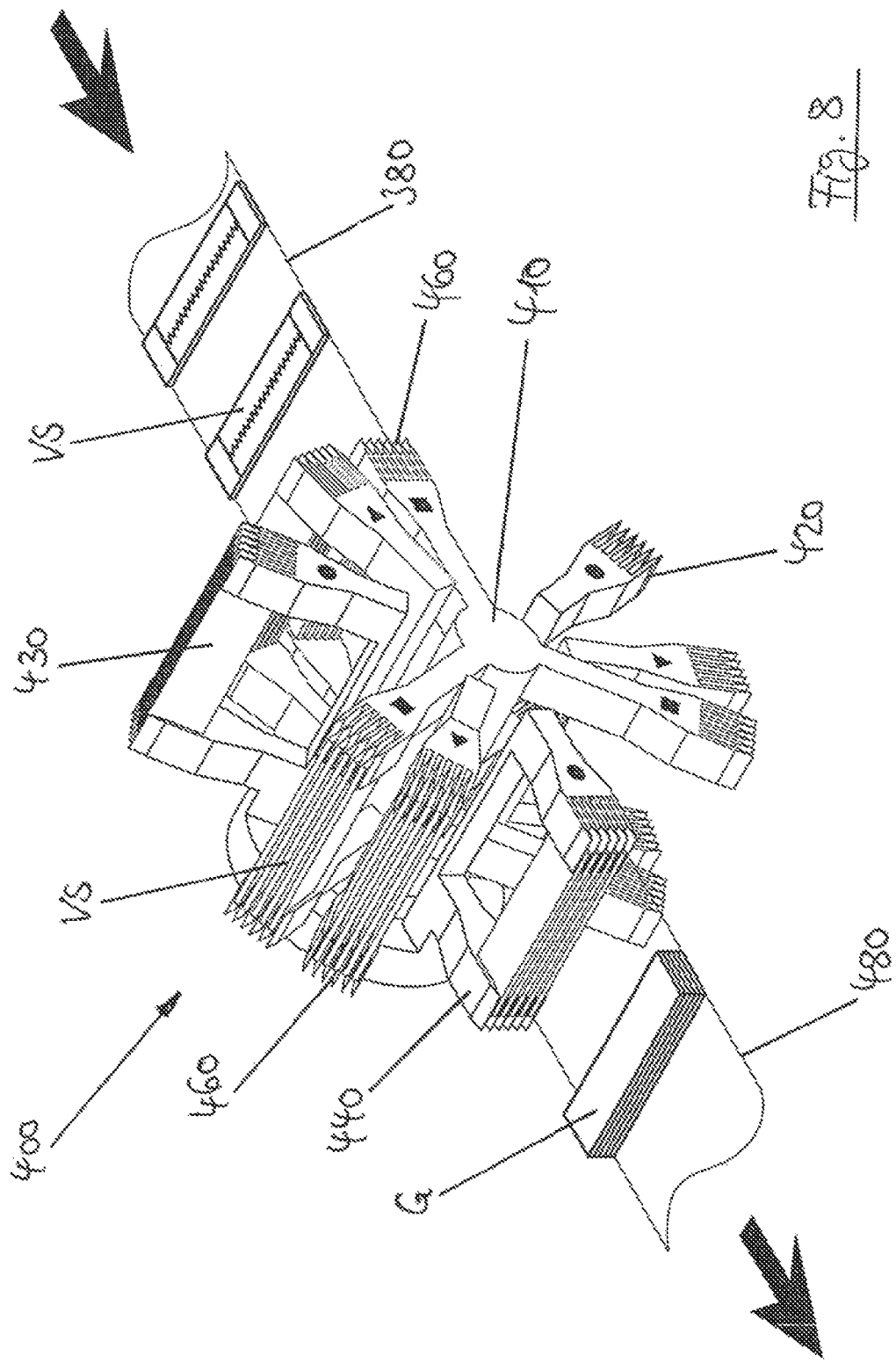
FIG. 8 is a perspective view of the group forming devices.

As FIGS. 7 and 8 show, the group forming devices 400 of the present embodiment comprise a collecting drum 410 which has a plurality of so-called channels. In technical circles, such a collecting drum is also called a "multiple-channel racetrack". In the embodiment illustrated in FIG. 8, the collecting drum 410 has three channels which are all arranged rotatably about a common axis ("three-channel racetrack"). Each channel is movable relative to the other channels of the collecting drum. Each of the channels has a plurality of receiving devices or collecting pockets 420, 430, 440, wherein each collecting pocket again has a plurality of compartments 460 for receiving a product strip VS. The number of compartments 460 of each collecting pocket 420, 430, 440 corresponds to the number of strips VS, from which a stack or a group G of strips is intended to be formed.

In the embodiment of FIG. 8, the collecting drum 410 has three channels which each again have three collecting pockets 420, 430, 440, wherein each collecting pocket has five compartments 460 each for receiving a strip VS. In FIG. 8, the three channels are indicated with the symbols circle, triangle and square, that is to say, all the collecting pockets 420, 430, 440 which in this instance have the same symbol belong to one channel. The collecting pockets of one channel are typically equidistant, that is to say, are arranged at an angle of 120°relative to each other. The channels rotate in an intermittently controlled manner about the axis of the drum 410, wherein they move slowly or rapidly in phases or come to a stop. Each of the channels may always further rotate only to such an extent that none of the collecting pockets 420, 430, 440 thereof collides with the preceding collecting pockets of another channel in the rotation direction. The three channels consequently move, on the one hand, independently of each other about the rotation axis, wherein they are controlled in the above-mentioned direction in terms of their rotation movement yet are dependent on each other. Each channel has an individual drive in the form of an electric motor (servomotor).

In FIG. 8, the individual packed strips VS are conveyed by the second strip conveying device 380 towards the collecting drum 410, where they are introduced individually and successively into the compartments 460 of a prepared collecting pocket 420, 430, 440 of one of the three channels. The relevant channel continues to rotate intermittently about a position in such a manner that the next compartment of the collecting pocket can be filled. As soon as all the compartments of that collecting pocket are filled, that collecting pocket rotates further into the discharge position of the collecting drum 410 opposite by 180°, where all the compartments 460 of that collecting pocket are emptied simultaneously in that the content of that collecting pocket is pushed out at the same time. This is brought about, for example, by a rake type conveyor 480 (see FIG. 7) which grips the stack of strips VS in the collecting pocket to be emptied from below and the rear, and pushes it in the conveying direction out of the relevant collecting pocket (in FIG. 8, in an oblique downward direction to the left). In this instance, consequently, a stack or a group G of five individual packed chewing gum strips VS is then provided.

Since the individual packed chewing gum strips VS are supplied by the strip conveying device 380 continuously with equal spacing, it must be ensured that those strips are removed and conveyed onwards in a continuous manner by the collecting drum 410. Whilst a collecting pocket 420, 430, 440 of a specific channel is consequently successively filled with the strips VS (five compartments 460 for receiving five strips VS), the collecting pocket of a next channel catches up to the preceding collecting pocket and is ready in order to take up the next five strips VS supplied successively in the compartments thereof without any interruption of the strip supply system, as soon as all the compartments of the preceding collecting pocket of the preceding channel are filled and that preceding collecting pocket has moved out of that filling zone (cf. also FIG. 7, right-hand side). Consequently, whilst the next collecting pocket is successively filled with strips VS, the other collecting pockets move further in a controlled manner under the condition that they do not collide with the preceding collecting pocket of a preceding channel. The collecting pockets completely filled with chewing gum strips VS move, as described above, through 180°into the discharge position, in which the group G is removed from the collecting pocket, respectively. Meanwhile, the collecting pockets already previously emptied at the discharge position continue to move successively and travel again to the initial position for receiving new, supplied strips VS.

In that manner, the operation of filling the collecting drum 410 with individual strips VS is decoupled in terms of time from the operation of removing the groups G formed from the collecting drum 410. This principle of temporal decoupling of the movements corresponds to the above-described principle which is applied :n the field of provision and supply of the slabs P to the slab conveying devices 150 and the separating devices 200, wherein the sequence of method steps is, however, carried out in a transposed manner to an extent. Whilst the slab P is provided and supplied at the machine inlet as a coherent, uniform structure and is then separated into individual strips S in the separating devices 200, the individual strips VS are supplied in the region of the group forming devices 400 and combined to form a group G and conveyed onwards as such.

Finally, the group packing devices 500 further adjoin the group forming devices 400 in the conveying direction in the packing machine and is again substantially formed by a packing material supply device 520 and folding devices in the form of a folding drum 550 having folding faces 554 and associated folding switches 556. As FIGS. 7 and 9 show, the formed groups G of the individual packed chewing gum strips VS are supplied to the group packing devices 500 by the rake type conveying device 480. The rake type conveying device 480 is in particular a double rake conveyor which has the advantage that the movement speed of each individual rake can be reduced, which is advantageous for reasons of drive mechanics and control.

The supplied strip group G initially passes through a packing material supply device 520 (comparable with the above-described packing material supply device 320 for the individual strips S; see FIG. 6) in which a second packing material V2 in which the group G is finally intended to be packed is supplied. The packing material supply device 520 again also comprises cutting devices 522, by means of which a packing material portion is produced and fed to the conveyor path. The packing material supply device 520 further comprises (also again similarly to the above-described packing material supply device 320 for the individual strips) packing material unrolling devices and packing material discharge devices which may substantially have the same mechanical/physical features as described above in connection with the first packing material supply device 320. In the region of the packing material supply device 520 for the strip group G, it is further possible also to provide for the provision, supply and unwinding of a tear-open strip for the packing.

As FIG. 9 shows, the packing material blank is placed in the region or the packing material supply device 520 around the supplied group G which is then supplied to the folding drum 550. In this folding drunk 550, the supplied, partially packed group G is rotated through 180°, wherein the projecting packing material portion is folded over by means of the folding face 554 of the folding drum 550 and, when the partially packed group G is pushed out of the folding drum 550, is completely placed against the packet termed in this manner. Suitable additional folding devices, in particular folding switches 556, which finally further fold the laterally projecting packing material portions over and place them on the formed packs, further then adjoin the folding drum 550, as can be seen in FIG. 9 at the lower left-hand end of the conveying path. A sealing device 570 may also be in this region and closes the packing material of the pack VG formed (cf. FIG. 7). The chewing gum strip pack VG formed is then finally further conveyed by a suitable conveying device, for example, a rake type conveying device 580 (preferably again a double rake) and discharged out of the packing machine.

List of Reference Materials

P Slab
PM Slab stack, magazine
R Groove
S Strip-like object, strip
V1 First packing material
VS Packed strip
G Group, stack of packed strips
V2 Second packing material
VG Packed strip group
100 Slab provision and supply devices
112 Pushing devices, slab pusher
114 Pushing devices, slab pusher
116 Pushing devices, slab pusher
118 Pushing devices, slab pusher
120 Cutter rollers, roller pair
130 Orientation devices
132 Stop
140 Pushing device, depositing plate
150 Slab supply devices, conveying devices
152 First slab conveying device, conveyor belt/pair
154 Second slab conveying device, conveyor belt/pair
200 Separating devices
210 First roller pair
220 Second roller pair
230 Third roller pair
250 Star-like conveying device, separating star-like member
300 Strip packing devices
310 First strip conveying device
312 Carrier
320 Packing material supply device
322 Cutting devices, cutting station
350 Folding devices, folding drum, slotted drum
352 Receiver
354 Folding face, drum inner wall
356 Folding devices, folding switches
380 Second strip conveying device
382 Carrier
400 Group forming devices
410 Collecting drum
420 First collecting pocket of a channel
430 Second collecting pocket of a channel
440 Third collecting pocket of a channel
460 Compartments in collecting pocket
480 Rake type conveying device, double rake
500 Group packing devices
520 Packing material supply devices
522 Cutting devices, cutting station
550 Folding devices, folding drum
554 Folding face
556 Folding devices, folding switches
570 Sealing device
580 Rake type conveying device, double rake

The invention claimed is:

1. A method for packing strip-like objects, in particular objects suitable for consumption, in particular chewing gum strips, having the following steps:
providing substantially rectangular slabs, from which the strip-like objects are to be formed, each strip-like object having a length, each slab having parallel shorter sides and parallel longer sides, the shorter sides having a length, wherein the length of the shorter sides of the slabs corresponds to the length of the strip-like object to be formed, the provided slabs including at least a first slab, a second slab, and a third slab, the first slab preceding the second slab in a direction of travel, and the second slab preceding the third slab in the direction of travel;
forming individual strip-like objects from the slabs provided;
packing the formed, individual strip-like objects with a first packing material;
forming a group of the individual, packed strip-like objects;
packing the formed group of strip-like objects with a second packing material;
characterized in that the step of providing the slabs comprises the following additional steps:
producing in the slabs grooves, including a foremost groove, the grooves extending substantially parallel with the shorter sides of the slabs;
controlling the supply of each of the provided slabs in a longitudinal direction successively to the following step of forming individual strip-like objects such that the second slab adjoins the first slab in a positionally precise and gapless manner, without back-up pressure;
and further characterized in that the step of forming individual strip-like objects comprises the following additional steps:
separating an individual strip-like object from the slab at a front end thereof in a conveying direction by tearing along the foremost groove in such a manner that the provided slab and the separated strip-like object are substantially in the same plane;
accelerating the separated strip-like object in the conveying direction in order to form a spacing between, successive, separated strip-like objects,
wherein the second slab is transferred to a first conveying device, by which the second slab is first accelerated and subsequently braked again in the longitudinal direction thereof so that the second slab adjoins the preceding first slab, and further characterized in that the third slab is transferred to a second conveying device which corresponds to the first conveying device and by which the third slab is first accelerated and subsequently braked again in the longitudinal direction thereof so that the third slab adjoins the preceding second slab, wherein the slabs are conveyed by the first conveying device and the second conveying device substantially without friction.

2. The method as claimed in claim 1, further characterized in that the provided slabs are orientated before the grooves are produced in such a manner that the slabs have, only at one of the ends thereof in the longitudinal direction, a projecting portion which is cut off when the grooves are produced.

3. The method as claimed in claim 1, further characterized in that the step of forming a group of individual packed strip-like objects, comprises forming a stack of a plurality of strip-like objects, each of the plurality of strip-like objects being one above the other.

4. The method as claimed in claim 1, further characterized in that the step of forming a group of individual packed strip-like objects comprises arranging a plurality of strip-like objects beside each other.

5. A method for packing strip-like objects, in particular objects suitable for consumption, in particular chewing gum strips, having the following steps:
  providing substantially rectangular slabs, from which the strip-like objects are to be formed, each strip-like object having a length, each slab having parallel shorter sides and parallel longer sides, the shorter sides having a length, wherein the length of the shorter sides of the slabs corresponds to the length of the strip-like object to be formed, the provided slabs including at least a first slab, a second slab, and a third slab, the first slab preceding the second slab in a direction of travel, and the second slab preceding the third slab in the direction of travel;
  forming individual strip-like objects from the slabs provided;
  packing the formed, individual strip-like objects with a first packing material;
  forming a group of the individual, packed strip-like objects;
  packing the formed group of strip-like objects with a second packing material;
  characterized in that the step of providing the slabs comprises the following additional steps:
    producing in the slabs grooves, including a foremost groove, the grooves extending substantially parallel with the shorter sides of the slabs;
    controlling the supply of each of the provided slabs in a longitudinal direction successively to the following step of forming individual strip-like objects such that the second slab adjoins the first slab in a positionally precise and gapless manner, without back-up pressure;
  and further characterized in that the step of forming individual strip-like objects comprises the following additional steps:
    separating an individual strip-like object from the slab at a front end thereof in a conveying direction by tearing along the foremost groove in such a manner that the provided slab and the separated strip-like object are substantially in the same plane;
    accelerating the separated strip-like object in the conveying direction in order to form a spacing between, successive, separated strip-like objects,
  wherein the provided slabs in their longitudinal direction and the individual strip-like objects formed therefrom pass through a plurality of successive conveying devices, each having a conveying speed and each of which grips and further conveys the slabs or the strip-like objects formed, wherein the conveying speed of the successive conveying devices increases in the conveying direction.

6. An apparatus for producing individual strip-like objects, in particular objects suitable for consumption, in particular chewing gum strips, comprising:
  slab supplying devices for providing slabs, from which the strip-like objects are to be formed, each strip-like object having a length, each slab having parallel shorter sides and parallel longer sides, the shorter sides having a length, wherein the length of the shorter sides of the slabs corresponds to the length of the strip-like object to be formed, comprising:
    cutter rollers for producing in the slab grooves, including a foremost groove, the grooves extending substantially parallel with the shorter sides of the slabs;
    conveying devices for controlling the supply of each of the slabs in a longitudinal direction successively to the separating devices for forming individual strip-like objects such that a second provided slab adjoins a first provided slab in a positionally precise and gapless manner, without back-up pressure;
  separating devices for forming individual strip-like objects from the slabs provided, comprising:
    a first and second roller pair for separating an individual strip-like object from the slab at a front end thereof in a conveying direction by tearing along the foremost groove in such a manner that the slab and the separated strip-like object are substantially in the same plane;
    a third roller pair for accelerating the separated strip-like object in the conveying direction in order to form a spacing between, successive, separated strip-like objects;
  a first conveying device for conveying the first provided slab substantially in a longitudinal direction thereof; and
  a second conveying device for conveying the second provided slab, which follows the first provided slab, substantially in a longitudinal direction thereof,
  wherein the first conveying and the second conveying device are controlled in such a manner that the slabs are first accelerated and subsequently braked again by the first conveying device and the second conveying device;
  wherein the first conveying device downstream of the second conveying device conveys a next provided slab, which follows the second provided slab, in this way, the first provided slab precedes the second provided slab, and the second provided slab precedes the next provided slab, and
  wherein the first conveying device and the second conveying device are arranged in such a manner that the first provided slab, the second provided slab, and the next provided slab are conveyed on the same conveying path in such a manner that each slab adjoins the slab preceding it in a positive-locking manner.

7. The apparatus as claimed in claim 6, further characterized in that the devices for providing the slabs have the following additional features:
  a magazine for providing the slabs as a stack of slabs;
  first and second pushing devices for removing one of the slabs from the magazine, for supplying a removed slab to the cutter rollers and for further conveying the removed slab downstream of the cutter rollers, wherein the first and second pushing devices move the removed slab substantially in a direction perpendicular to the longitudinal direction thereof.

8. The apparatus as claimed in claim 6, further characterized in that the first conveying device and the second conveying device each have at least one conveyor belt, wherein the first provided slab is supported on the at least one conveyor belt of the first conveying device and the second provided slab is supported on the at least one conveyor belt of the second conveying device substantially without any friction, wherein the at least one conveyor belt of the first conveying device has at least one carrier, which the first provided slab abuts and the next provided slab abuts, and wherein the at least one conveyor belt of the second conveying device has at least one carrier, which the second provided slab abuts.

9. The apparatus as claimed in claim 8, further characterized in that the conveyor belt of the first conveying device has a protrusion in the region in which the first provided slab is supported, the protrusion supporting the first provided slab in such a manner that the first provided slab does not touch the adjacent conveyor belt of the second conveying device, and in that the conveyor belt of the second conveying device has a protrusion in the region in which the second provided slab is supported, the protrusion supporting the second provided slab in such a manner that the second provided slab does not touch the adjacent conveyor belt of the first conveying device.

10. The apparatus as claimed in claim 6, further characterized by pushing devices for transferring the removed slabs downstream of the cutter rollers to the first conveying device or the second conveying device, wherein the pushing devices move the removed slabs substantially in a direction perpendicular to the longitudinal direction thereof.

11. The apparatus as claimed in claim 6, further characterized by orientating devices arranged upstream of the cutter rollers in the conveying direction for orientating the slabs in such a manner that the slabs have, only at one end thereof in the longitudinal direction, a projecting portion which is cut off when the grooves are produced.

12. The apparatus as claimed in claim 6, wherein the slabs include at least a first slab, a second slab, and a third slab, wherein the first slab precedes the second slab in a direction of travel, and the second slab precedes the third slab in the direction of travel.

13. An apparatus for producing individual strip-like objects, in particular objects suitable for consumption, in particular chewing gum strips, having the following features:
   devices for providing slabs, from which the strip-like objects are to be formed, each strip-like object having a length, each slab having parallel shorter sides and parallel longer sides, the shorter sides having a length, wherein the length of the shorter sides of the slabs corresponds to the length of the strip-like object to be formed, comprising:
      cutter rollers for producing grooves, including a foremost groove, the grooves extending substantially parallel with the shorter sides of the slabs;
      conveying devices for controlling the supply of each of the slabs in a longitudinal direction successively to the separating devices for forming individual strip-like objects such that a second provided slab adjoins a first provided slab in a positionally precise and gapless manner, without back-up pressure;
   separating devices for forming individual strip-like objects from the slabs provided, comprising:
      devices for separating an individual strip-like object from the slab at a front end thereof in a conveying direction by tearing along the foremost groove in such a manner that the slab and the separated strip-like object are substantially in the same plane;
      devices for accelerating the separated strip-like object in the conveying direction in order to form a spacing between, successive, separated strip-like objects,
   wherein the devices for forming individual strip-like objects have a plurality of successive conveying devices, each having a conveying speed, wherein the conveying speed of the successive conveying devices increases in the conveying direction, and wherein the conveying devices each grips and further conveys the substantially rectangular slabs, which are mutually successive in a gapless manner in the longitudinal direction thereof, and the individual strip-like objects formed therefrom.

14. The apparatus as claimed in claim 13, further characterized by a first roller pair, a second roller pair, and a third roller pair, each roller pair is arranged parallel with the other roller pairs, the third roller pair is arranged after the second roller pair in the conveying direction, the second roller pair arranged after the first roller pair in the conveying direction, and each of the first roller pair, the second roller pair, and the third roller pair has an axis and a rotation speed, wherein the rotation speed of the successive roller pairs increases in the conveying direction, such that the rotation speed of the third roller pair is greater than the rotation speed of the second roller pair and the rotation speed of the second roller pair is greater than the rotation speed of the first roller pair, wherein a spacing in the conveying direction between the axis of the first roller pair and the axis of the second roller pair is substantially identical to a width of the individual strip-like object to be formed in the conveying direction, wherein a spacing in the conveying direction between the axis of the second roller pair and the axis of the third roller pair is substantially identical to the width of the individual strip-like object to be formed in the conveying direction, and wherein the first roller pair grips the supplied slab and the second roller pair and the third roller pair separate the strip-like object from the slab.

15. The apparatus as claimed in claim 14, further characterized in that the slab has a supplied speed and the rotation speed of the first roller pair substantially corresponds to the speed of the slab.

16. The apparatus as claimed in claim 14, further characterized in that a star-like conveying device is arranged in the conveying direction downstream of the third roller pair, wherein the star-like conveying device rotates about an axis is arranged parallel with the axes of the first roller pair, the second roller pair, and the third roller pair, and wherein the star-like conveying device accelerates the separated strip-life object in the conveying direction in order to form a defined spacing between individual, successive strip-like objects.

17. An apparatus for producing individual strip-like objects, in particular objects suitable for consumption, in particular chewing gum strips, comprising:
   devices for providing slabs, from which the strip-like objects are to be formed, each strip-like object having a length, each slab having parallel shorter sides and parallel longer sides, the shorter sides having a length, wherein the length of the shorter sides of the slabs corresponds to the length of the strip-like object to be formed, comprising:
      cutter rollers for producing grooves, including a foremost groove, the grooves extending substantially parallel with the shorter sides of the slabs;
      conveying devices for controlling the supply of each of the slabs in a longitudinal direction successively to the separating devices for forming individual strip-like objects such that a second provided slab adjoins a first provided slab in a positionally precise and gapless manner, without back-up pressure;
   separating devices for forming individual strip-like objects from the slabs provided, comprising:
      devices for separating an individual strip-like object from the slab at a front end thereof in a conveying direction by tearing along the foremost groove in such a manner that the slab and the separated strip-like object are substantially in the same plane;
      devices for accelerating the separated strip-like object in the conveying direction in order to form a spacing between, successive, separated strip-like objects;
   strip packing devices for packing the individual strip-like objects produced with a first packing material;

group forming devices for forming a group of the individual packed strip-like objects; and group packing devices for packing the formed group of the strip-like objects with a second packing material, wherein group forming devices for forming a stack of a plurality of strip-like objects have a collecting drum having a plurality of channels, wherein the plurality of channels of the collecting drum rotate about a common axis, wherein each channel of the plurality of channels is movable relative to the other channels of the plurality of channels, wherein each channel of the plurality of channels has a plurality of collecting pockets, wherein each collecting pocket has a plurality of compartments for receiving a one of the strip-like objects, and wherein a quantity of compartments in the plurality of compartments corresponds to a quantity of strip-like objects in a stack to be formed, and wherein the group forming devices for forming a group of the individual packed strip-like objects have devices for forming a stack of a plurality of strip-like objects, each of the plurality of strip-like objects being one above the other.

18. The apparatus as claimed in claim 17, further characterized in that the collecting drum has three channels, each channel having three collecting pockets, and each collecting pocket having five compartments.

19. The apparatus as claimed in claim 17, farther characterized in that the group forming devices for forming a group of the individual packed strip-like objects arranges a plurality of strip-like objects beside each other.

20. The apparatus as claimed in claim 17, further characterized in that the strip packing devices for packing the produced, individual strip-like objects with a first packing material and the group packing devices for packing the formed group of the strip-like objects with a second packing material have packing material supply devices and cutting devices for supplying a packing material portion and folding devices for folding projecting portions of the packing material portion around the individual strip-like objects or groups of the strip-like objects which are intended to be packed.

* * * * *